United States Patent [19]

Burdick

[11] 4,186,813
[45] Feb. 5, 1980

[54] STEERABLE DRIVE UNIT FOR TRANSPORTER

[75] Inventor: Robert E. Burdick, Santa Barbara County, Calif.

[73] Assignee: Rolair Systems, Inc., Santa Barbara, Calif.

[21] Appl. No.: 893,079

[22] Filed: Apr. 3, 1978

[51] Int. Cl.² .............................. B60V 1/00; B60K 7/00
[52] U.S. Cl. ..................................... 180/13; 180/19 S; 180/119; 280/43.23
[58] Field of Search .................. 280/43.23, 125, 43.17; 180/125, 124, 19 R, 19 S, 19 H, 13, 12, 42, 52, 48

[56] References Cited
U.S. PATENT DOCUMENTS

| 2,513,718 | 7/1950 | Gfrorer | 180/13 X |
| 3,183,989 | 5/1965 | Trusock | 180/13 |
| 3,188,978 | 6/1965 | Dolphin | 180/13 X |
| 3,756,342 | 9/1973 | Burdick | 180/124 |
| 3,791,477 | 2/1974 | Burdick | 180/117 |
| 3,796,279 | 3/1974 | Burdick | 180/124 |
| 3,829,116 | 8/1974 | Burdick | 280/43.23 |
| 3,831,708 | 8/1974 | Terry | 180/125 X |

Primary Examiner—Joseph F. Peters, Jr.
Assistant Examiner—Randall A. Schrecengost
Attorney, Agent, or Firm—Harris, Kern, Wallen & Tinsley

[57] ABSTRACT

A transporter for moving large cylindrical loads, such as paper rolls 8 feet in diameter and 8 feet long. A U-shaped frame with spaced arms carrying air bearings, an on board compressor for a self contained air supply, and a drive unit which can be coupled and removed from the frame to provide propulsion and steering, with controls at the drive unit for handling of the transporter by a single person. Laterally moving load lifters are carried in the arms of the frame, with the lifters retracted as the frame is moved into position with the load between the arms. Hydraulic cylinders extend the load lifters inwardly to engage and, if desired, lift the load. The air bearings are inflated to lift the transporter and load for movement along the floor. The drive unit has an outer shell for direct connection to the transporter frame, an inner frame rotatable in the outer shell for steering, and a drive wheel movable vertically in the frame for engaging the floor.

3 Claims, 10 Drawing Figures

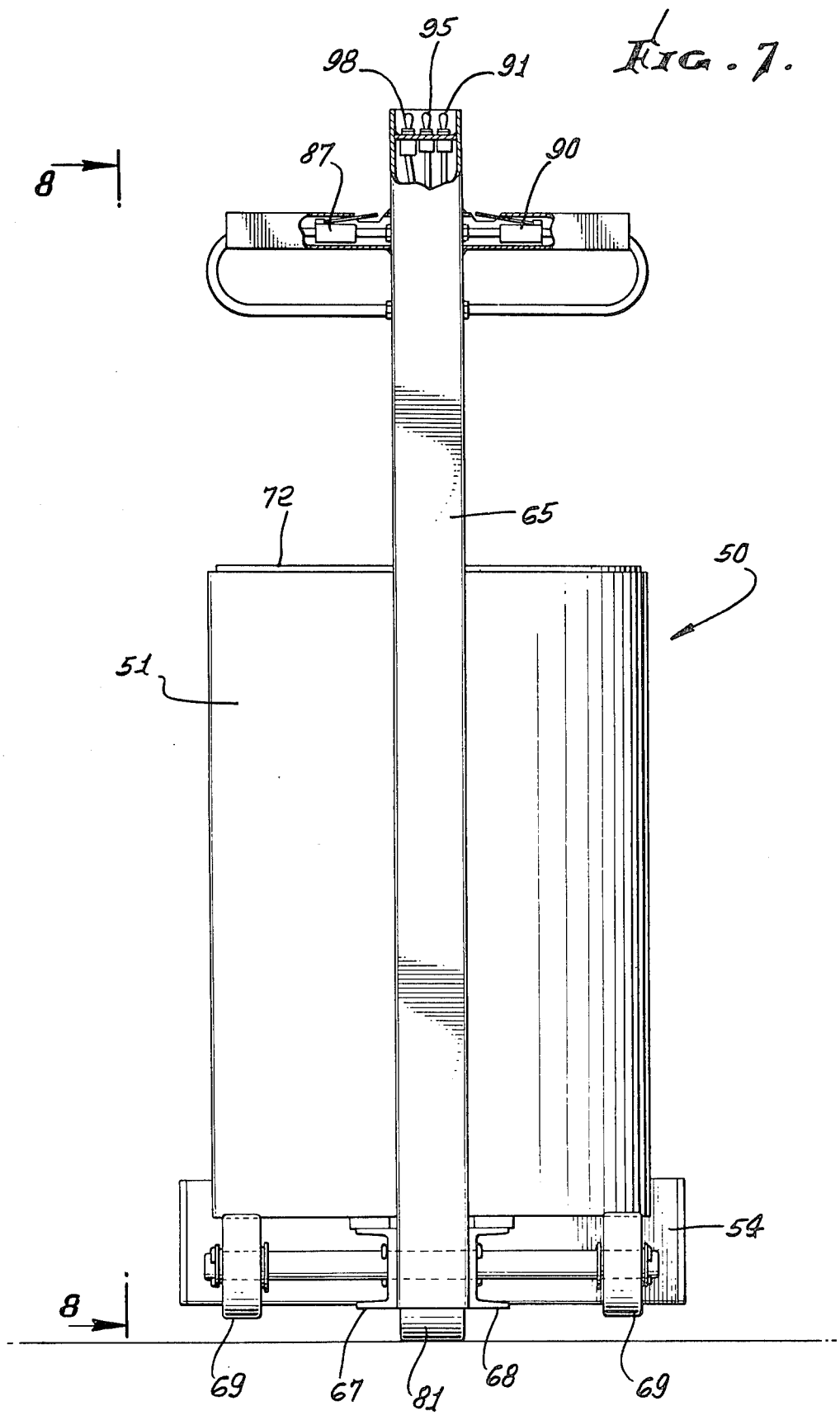

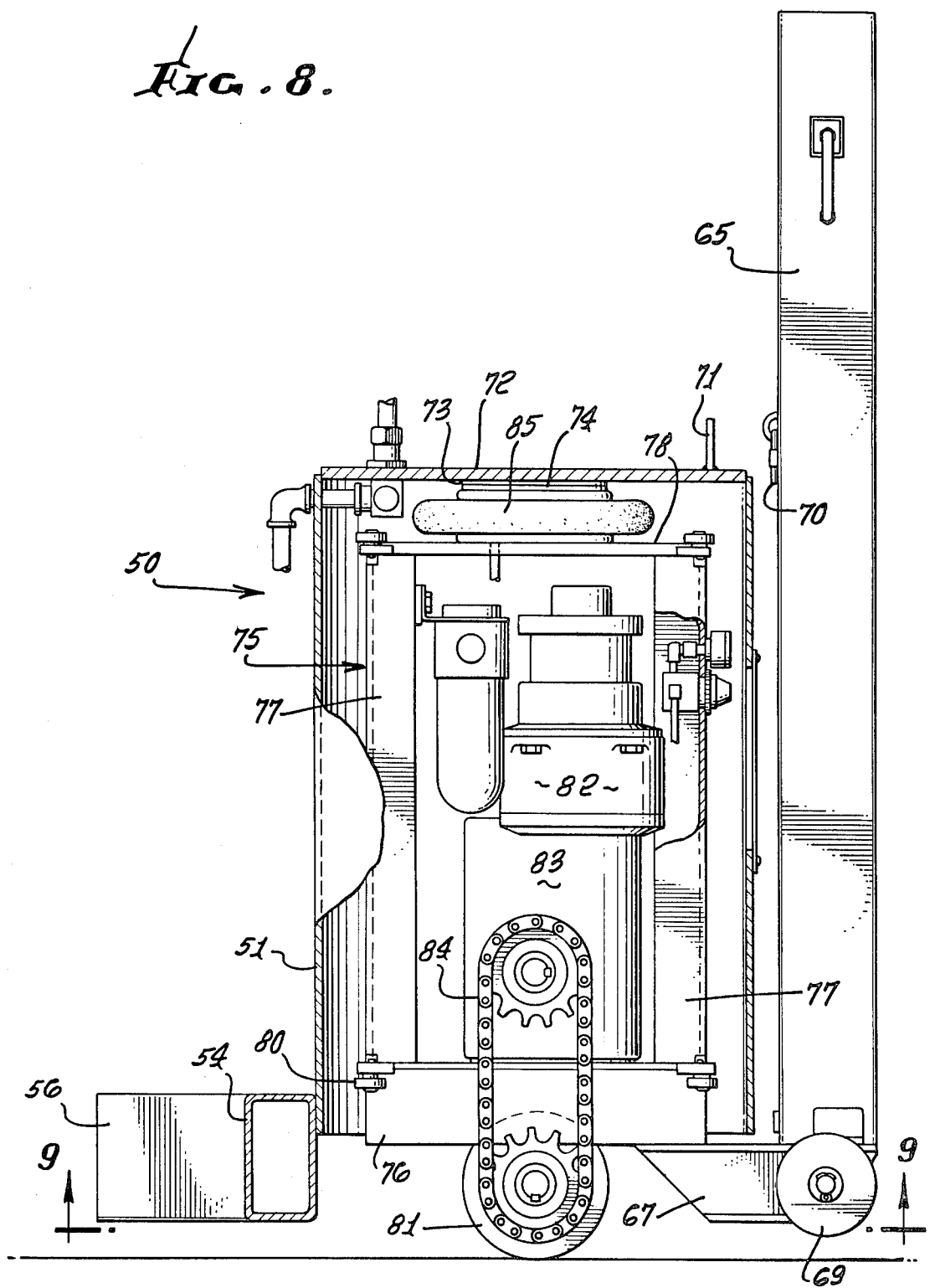

4,186,813

STEERABLE DRIVE UNIT FOR TRANSPORTER

BACKGROUND OF THE INVENTION

This invention relates to apparatus for moving large loads, particularly loads of the type which are easily damaged, such as rolls of paper utilized in fabricating containers and the like. A typical roll may be a coil of corrugated paper in the order of 8 feet in diameter and 8 feet long. It is desirable that plant operators be able to propel and steer such rolls along a floor or other surface through a warehouse or manufacturing facility or the like with a minimum effort and little or no damage to the outer layers of the roll.

It is an object of the present invention to provide a new and improved drive unit for propelling and steering a transporter for handling large loads. A further object is to provide such a drive unit which can be connected to and removed from a transporter, and which can easily be operated by one person.

These and other objects, advantages, features and results will more fully appear in the course of the following description.

Air bearings have been utilized in transporters of various types in the past, and typical devices are shown in U.S. Pat. Nos. 3,756,342; 3,791,477 and 3,796,279.

SUMMARY OF THE INVENTION

The drive unit of the present invention provides for moving a transporter or other load carrier over a floor or other surface. The drive unit includes first and second frames with the second frame sliding vertically and pivoting horizontally with respect to the first frame. The first frame has members which provide for coupling the drive unit to the load carrier. A drive wheel is mounted in the second frame and is powered by a drive motor carried in the second frame, typically an air operated motor. A lifting device such as an air cylinder is positioned between the frames for moving the second frame vertically to bring the drive wheel into engagement with the floor, and a steering arm is connected to the second frame for pivoting the second frame relative to the first frame as the drive unit moves to steer the load. In the preferred embodiment, controls for energizing the drive wheel and for urging the drive wheel into engagement with the floor are carried in the steering arm providing complete control of the overall system by a single operator.

BRIEF DESCRIPTION OF THE DRAWINGS

FIG. 6 is an enlarged sectional view taken along the line 6—6 of FIG. 2;

FIG. 7 is an enlarged end view of the drive unit of FIG. 1;

FIG. 8 is a side view of the drive unit of FIG. 7;

DESCRIPTION OF THE PREFERRED EMBODIMEMT

Figure 10:
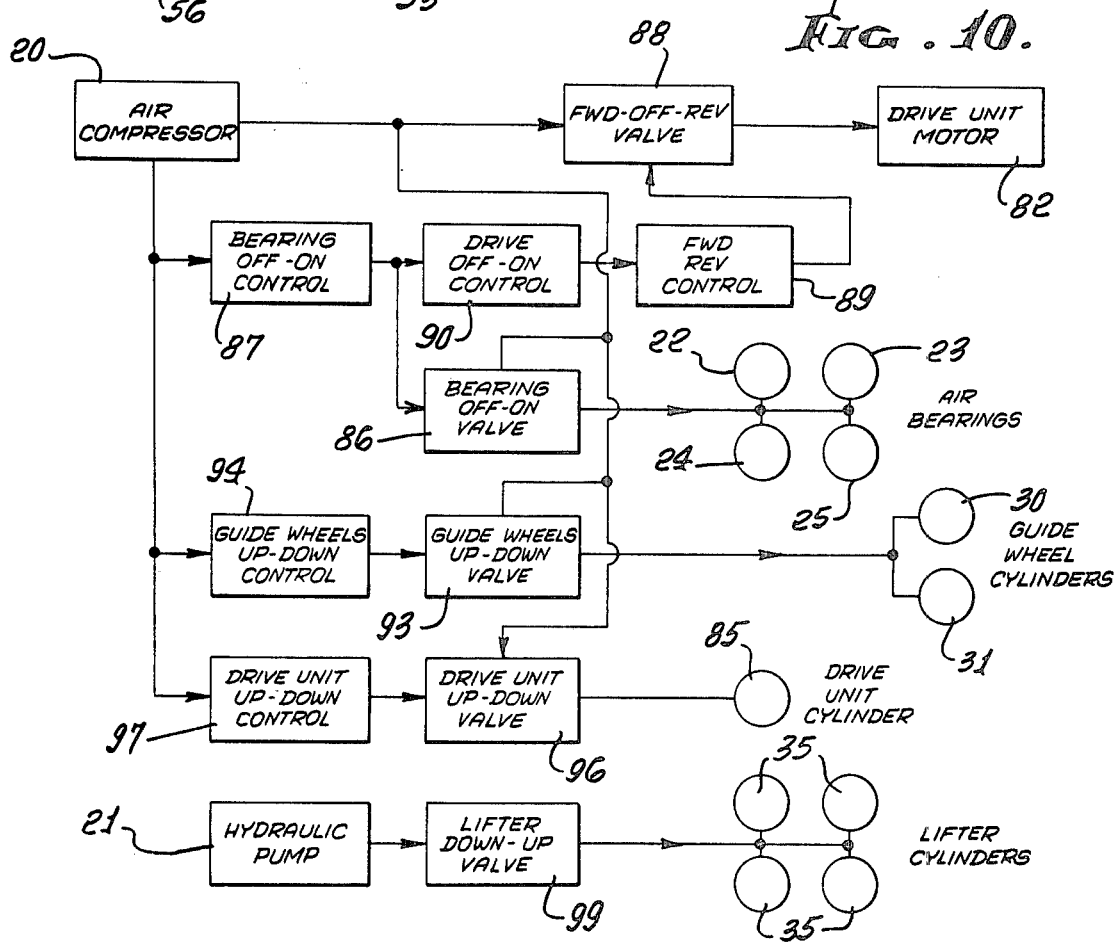
FIG. 10 is a diagram illustrating the air and hydraulic controls.

The transporter as shown in FIGS. 1-5 includes a U-shaped frame 12 with parallel arms 13, 14 and a cross member 15. A platform 16 is fixed to the cross member 15 of the frame 12, and a power package 17 is carried on the platform 16. Typically the power package includes an air compressor 20 and a hydraulic pump 21 (FIG. 10) driven by an internal combustion engine.

Air bearings 22, 23 are mounted in the arm 13 and air bearings 24, 25 are mounted in the arm 14. The air bearings may be conventional in design and the frame may be built of box beams and plates in the conventional manner. Reference may be made to U.S. Pat. Nos. 3,756,342; 3,791,477; and 3,796,279 for details of construction of the air bearings and the frame. A retractable guide wheel 28 is carried in the arm 13 and a similar wheel 29 is carried in the arm 14. The wheel 28 is urged downward by an air cylinder 30 and the wheel 29 is urged downward by an air cylinder 31. Reference may be made to U.S. Pat. No. 3,829,116 for details of a suitable guide wheel mechanism.

Two load lifters 34 are provided in the arm 13 and two in the arm 14, and one such load lifter is shown in greater detail in FIG. 6. A hydraulic cylinder 35 is positioned inside the arm 14, with one end 36 of the cylinder attached to a vertical wall of the arm by a pin 37. A box member 38 slides laterally within the arm 14 of the frame and has a sloping pad 40 at the inner end. A piston 41 slides in the cylinder 35 and is coupled to the box member 38 by a pin 42. A cushion 43 may be applied on the outer face of the pad 40 if desired.

Figure 9:
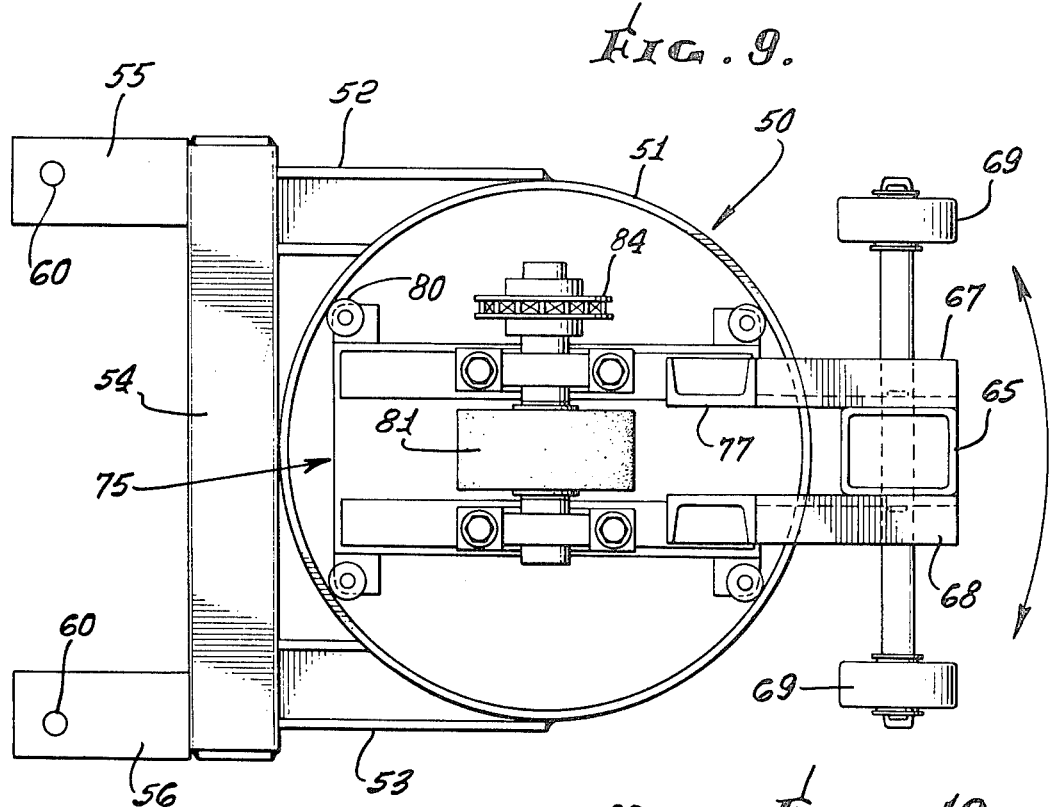
FIG. 9 is a bottom view of the drive unit of FIG. 7.

The frame may be used as described thus far, but preferably is utilized with a drive unit 50 which is adapted to be connected to and disconnected from the frame for propelling and controlling the operation of the frame. The drive unit is shown in greater detail in FIGS. 7, 8 and 9.

The drive unit includes a vertical tank 51, horizontal side members 52, 53, a cross member 54, and coupling members 55, 56, all of which may be of welded steel construction. The coupling members 55, 56 are preferably designed for sliding insertion into box beams 57, 58 of the frame, and may be locked in place by pins 59 (FIG. 3) passing through openings in the box beams and corresponding openings 60 in the coupling members. The box beams 57, 58 preferably are spaced and dimensioned so that the frame 12 can be engaged and moved by the conventional fork lift truck.

A steering and control handle 65 is mounted on a shaft 66 carried in channels 67, 68. Wheels 69 are also mounted on the shaft 66. The handle 65 may be latched in the vertical position by a hook 70 and eye 71.

A frame 75 comprising horizontal members 76, vertical members 77 and a top plate 78 is mounted on the channels 67, 68. The frame 75 is rotatably positioned within the cylindrical tank 51 with eight rollers 80.

A drive wheel 81 is mounted in the frame 75 and projects below the frame. The wheel 81 is driven by a motor 82 through a gear reduction 83 by a chain 84 carried within the frame 75. The frame with the drive motor and drive wheel is moved vertically relative to the outer cylinder 51 by an air cylinder 85, which may be fixed to the top plate 78 of the frame 75 and bear against the top 72 of the tank 51 at bearing plates 73, 74.

Figure 1:
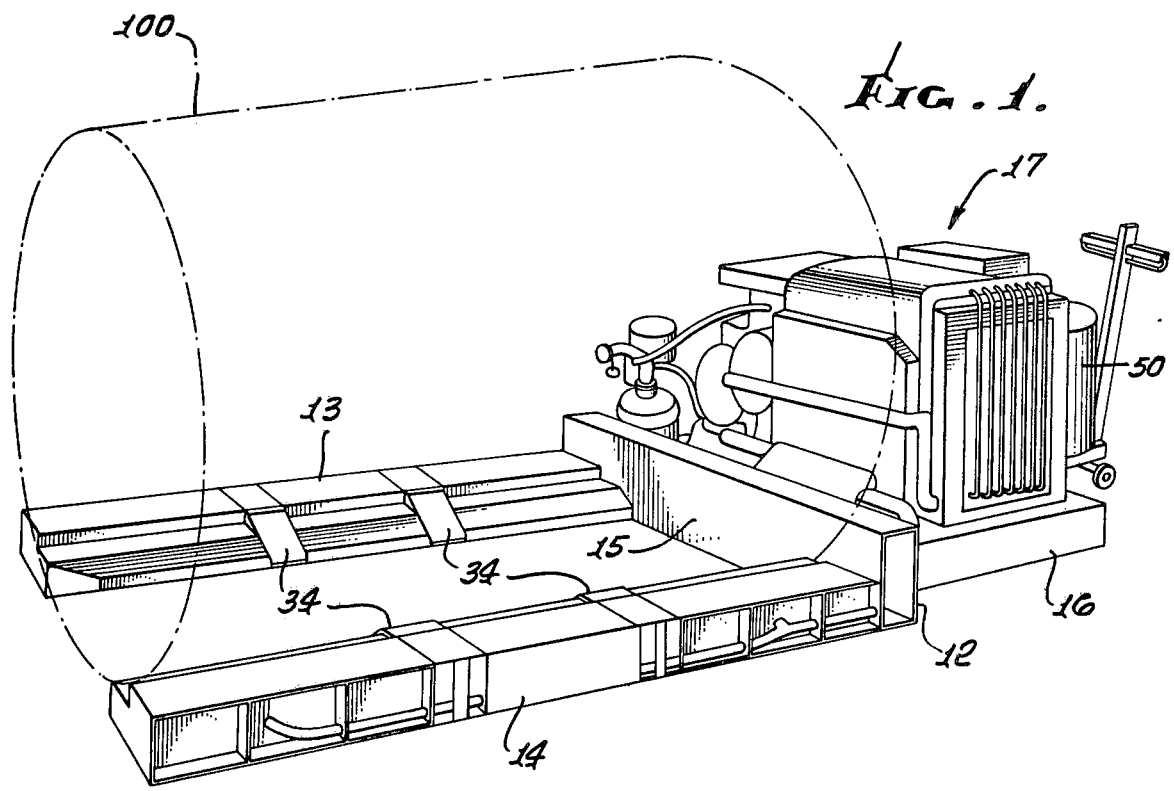
FIG. 1 is a perspective view of a transporter incorporating the presently preferred embodiment of the invention, with the load shown in phantom lines.
Figure 2:
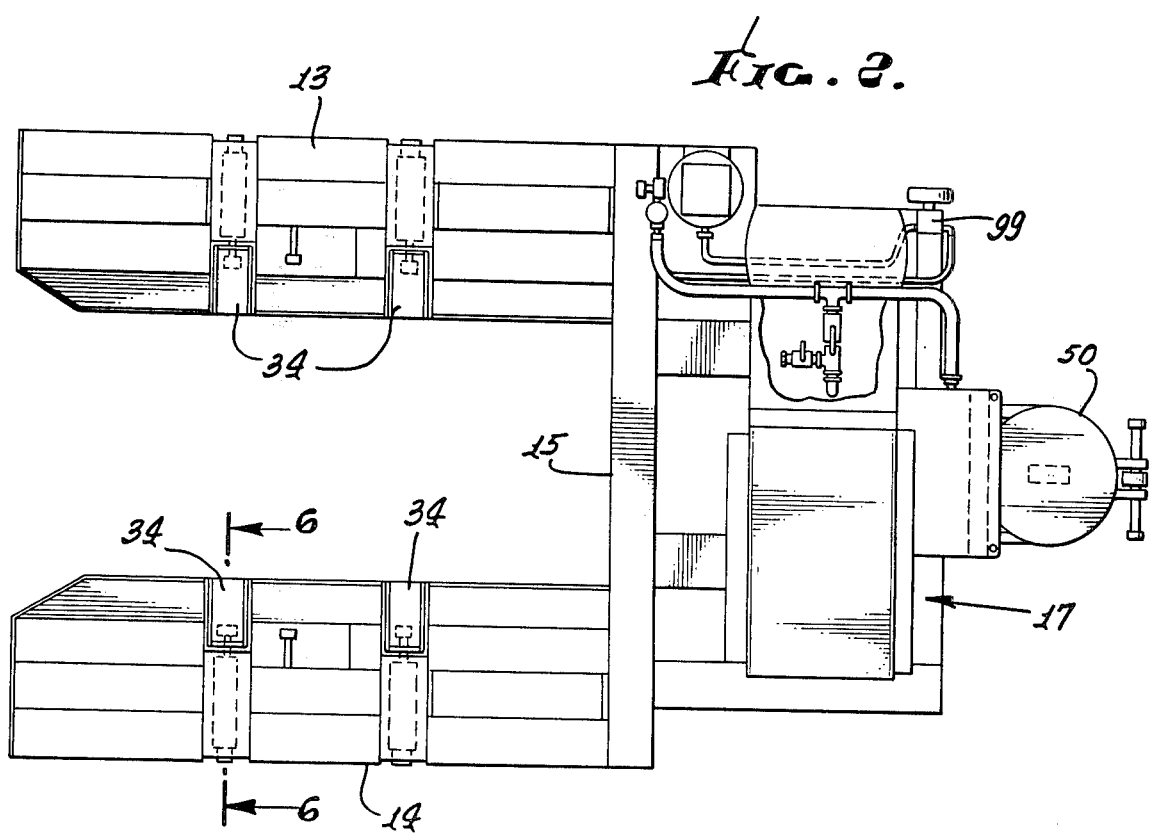
FIG. 2 is a top view of the unit of FIG. 1.
Figure 3:
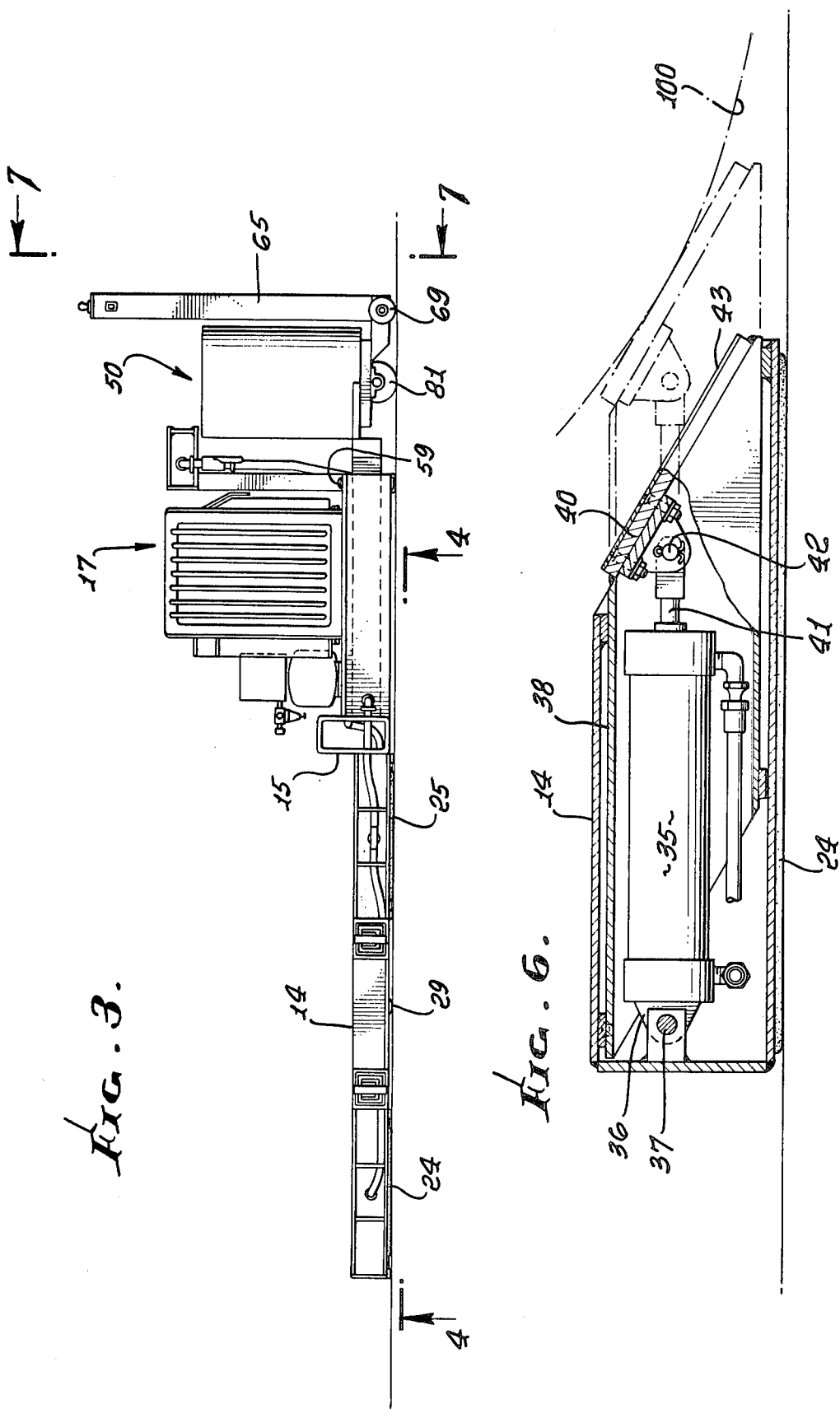
FIG. 3 is a side view of the unit of FIG. 1.
Figure 4:
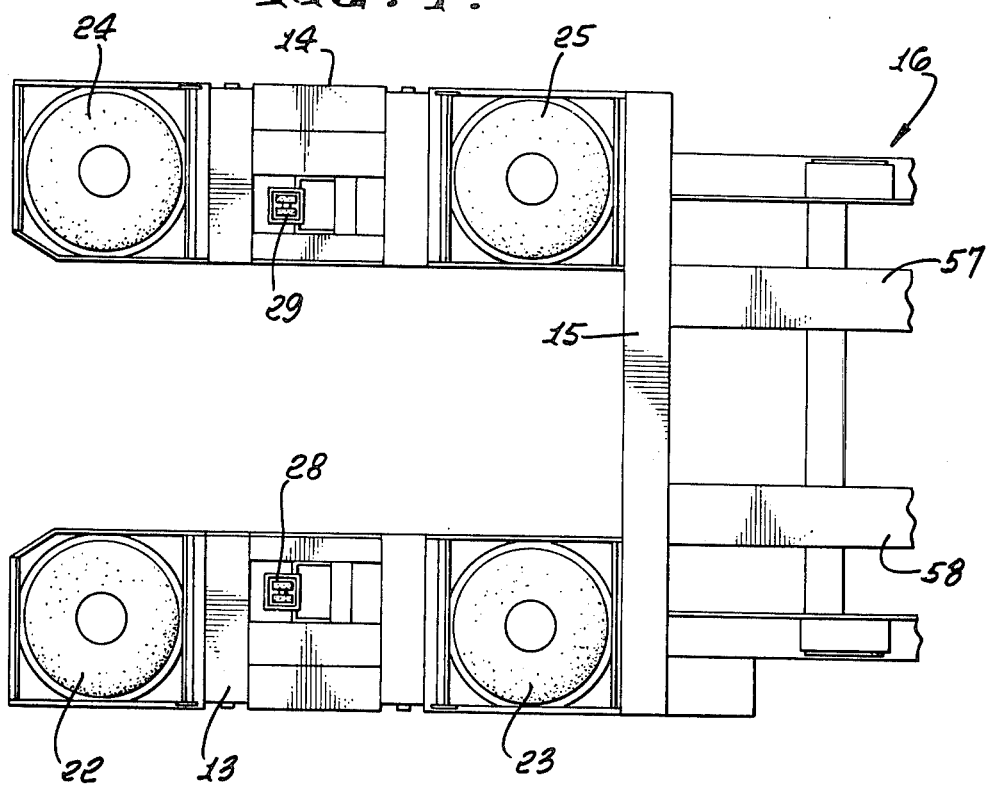
FIG. 4 is a partial bottom view of the unit of FIG. 1.

Air to the air bearings is provided through a bearing off-on valve 86 which is controlled by a bearing off-on control valve 87, preferably mounted in the cross-arm of the handle 65. Air for the drive motor 82 is provided through a forward-off-reverse valve 88 which is controlled by a forward-reverse control valve 89 and a drive off-on control valve 90. The valve 90 preferably is mounted in the arm of handle 65. The valve 89 preferably is solenoid operated by a toggle switch 91 in the handle 65. The air cylinders 30, 31 for the guide wheels are powered through a guide wheel up-down valve 93 which is controlled by an up-down control valve 94, which in turn may be solenoid operated via a toggle switch 95. The drive unit cylinder 85 is energized through a drive unit up-down valve 96 which is controlled by an up-down control valve 97 which in turn may be operated by a solenoid via toggle switch 98. The lifter cylinders 35 are powered from the hydraulic pump 21 and controlled by a lifter down-up valve 99, which preferably is a foot operated valve mounted on the platform 16 (FIG. 2).

Figure 5:
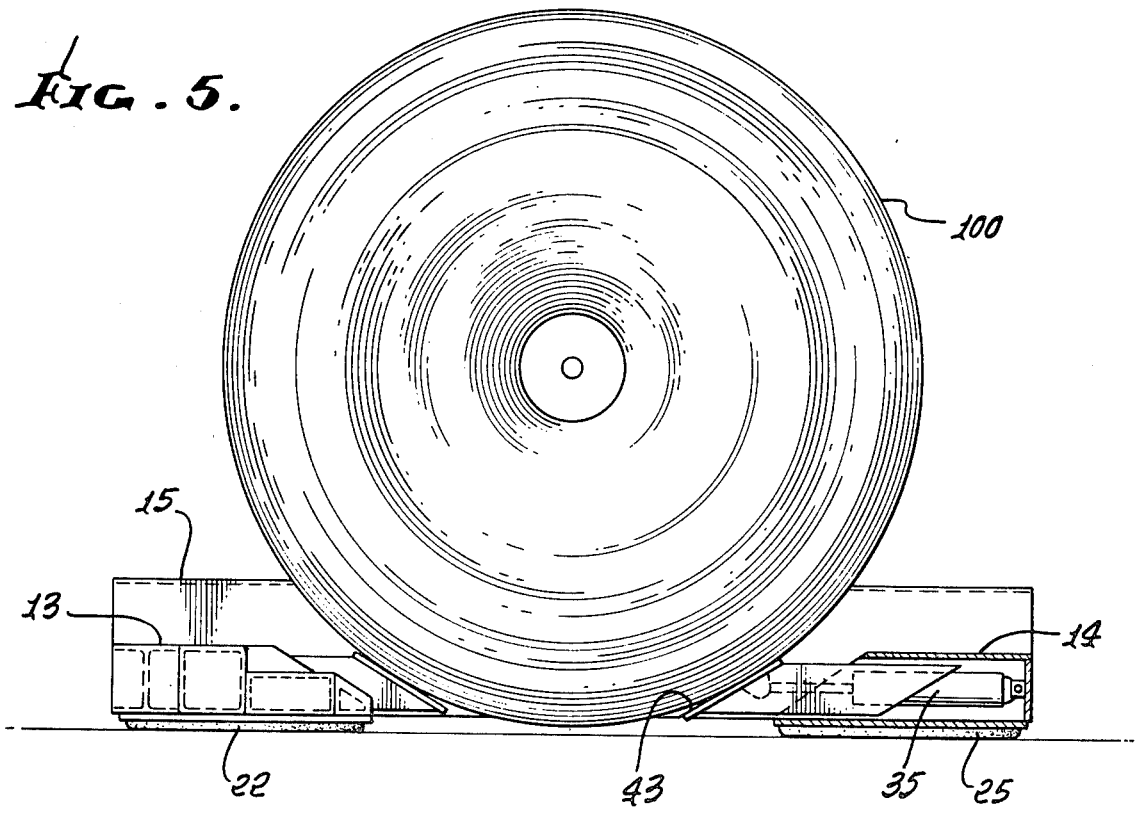
FIG. 5 is an end view of the unit of FIG. 1, with the load lifted.

In the preferred mode of operating, the drive unit 50 is coupled to the frame 12 and the engine for the air compressor and hydraulic pump is started. Valve 87 is actuated to provide air to the air bearings, which inflate and raise the frame. Valve 94 is actuated to provide air to the guide wheel cylinders, moving the guide wheels downward into engagement with the floor or other surface on which the transporter is resting. Valve 97 is actuated to provide air to the drive unit cylinder and move the drive wheel down into engagement with the floor. Valve 90 is then actuated to provide air to the drive motor and the unit will be propelled along the floor and can be steered into position about a roll or other cylindrical load 100 by the steering arm 65. When the transporter is in position with the roll between the arms 13, 14, the drive motor 82 is shut off, the guide wheel cylinders 30, 31 and drive unit cylinder 85 are exhausted, and the air bearings are deflated. The lifter cylinders 35 are then energized to move the lifter pads inward from the position shown in FIG. 2 and in solid lines in FIG. 6, to the position shown in phantom lines in FIG. 6 engaging the load 100. The lifter cylinders are then locked in this load engaging position by closing the control valve. The air bearings are then inflated by control valve 87 and the transporter is raised, raising the load from the floor, as shown in FIG. 5. The transporter is then ready for moving as previously described, by energizing the guide wheel cylinders, the drive unit cylinder and the drive motor.

When the load has been moved to the desired location, the drive motor is shut off, the guide wheel cylinders and drive unit cylinder are exhausted and the air bearings are deflated, thereby depositing the load on the floor. The load engaging pads are retracted by reversing the direction of motion of the pistons in the lifter cylinders, and the transporter may then be moved away from the load.

In an alternative mode of operation, the lifter cylinders may be operated so that the engagement of the lifter pads with the load and the movement of the opposing pads toward each other lifts the load from the floor. Then after the lifter cylinders are locked in position, the air bearings are inflated to lift the load further above the floor.

I claim:

1. In a drive unit for moving a transporter or other load carrier over a floor or the like, the combination of:
    a first frame including a circular sleeve;
    coupling means for removably coupling said first frame to the carrier;
    a second frame;
    said first and second frames having interengaging means for vertical sliding and horizontal pivoting of said second frame with respect to said first frame;
    said interengaging means consisting of vertically spaced sets of rollers mounted on said second frame for rotation about vertical axes in engagement with the inner wall of said sleeve;
    a drive wheel mounted in said second frame;
    drive means for rotating said drive wheel;
    lift means for moving said second frame vertically relative to said first frame for engaging said drive wheel with the floor for propelling the carrier;
    a steering arm connected to said second frame for pivoting said second frame relative to said first frame for steering the carrier;
    with said steering arm connected to said second frame at a pivot axis for pivoting in a vertical plane; and
    a pair of auxiliary wheels mounted on said second frame for rotation on said pivot axis and for tipping of said drive unit about the axis of said auxiliary wheels;
    with said rollers rotating when said second frame is rotated about a vertical axis relative to said first frame and with said rollers sliding along said sleeve inner wall when said second frame is moved vertically relative to said first frame.

2. A drive unit as defined in claim 1 wherein said lift means includes a fluid actuated cylinder positioned between the tops of said first and second frames.

3. A drive unit as defined in claim 2 including controls for said drive means and lift means mounted in said steering arm.

* * * * *